United States Patent Office 3,637,643
Patented Jan. 25, 1972

3,637,643
PROTEIN SEPARATION FROM WHEY USING A SOLUBILIZED PHOSPHATE
Winston Harold Wingerd, Elgin, Ill., assignor to Borden Inc., New York, N.Y.
No Drawing. Continuation-in-part of application Ser. No. 745,142, July 16, 1968, which is a continuation-in-part of application Ser. No. 486,524, Sept. 10, 1965, which in turn is a continuation-in-part of application Ser. No. 395,562, Sept. 10, 1964. This application Feb. 2, 1970, Ser. No. 7,974
Int. Cl. A23j *1/20*
U.S. Cl. 260—122                4 Claims

ABSTRACT OF THE DISCLOSURE

This invention relates to the method of separating proteins in undenatured form from a crude source thereof by first reducing the ratio of divalent cations to actual protein in the source to no more than about 1 part by weight of divalent cations to 35 parts by weight of actual source followed by admixing with said source a solubilized phosphate composition consisting essentially of one part by weight of a potassium polymetaphosphate and from about 5 to about 15 parts of a sodium phosphate, and to the resulting products. The invention has particular reference to the separation of lactalbumin from whey and to the resulting products.

REFERENCE TO RELATED APPLICATIONS

This application is a continuation-in-part of copending application Ser. No. 745,142 filed on July 16, 1968; application Ser. No. 745,142 is a continuation-in-part of copending application Ser. No. 486,524 filed on Sept. 10, 1965; and application Ser. No. 486,524 is a continuation-in-part of copending application Ser. No. 395,562 filed on Sept. 10, 1964. Application Ser. No. 475,567 filed on July 28, 1965, is also a continuation-in-part of copending application Ser. No. 395,562 filed on Sept. 10, 1964. All of the above-mentioned applications have been abandoned.

BACKGROUND OF THE INVENTION

Many food products are improved nutritionally by supplementation with proteins. Thus, it is common to fortify breads, cakes, cereals and other food products with proteins. The use for this purpose of proteins in undenatured and water-soluble form from meat and eggs and particularly milk which are of higher nutritional value than the cereal or vegetable proteins has been desired but heretofore impractical. Particularly desired as a source of this protein material is undenatured lactalbumin because of its bland taste.

Proteins, including lactabumin, have been separated from crude sources of the same by precipitation with certain phosphoric acids and water soluble phosphate compounds. None of these prior procedures are commercially satisfactory since it has been difficult to precipitate the proteins rapidly enough to process them in an economic commercial manner. Moreover, all the prior procedures are unsatisfactory in that they require large amounts of phosphate which greatly increases the cost of the resultant products.

Particularly in the case of lactalbumin, such prior processes have not been successful because of the specific gravity of the treated protein. It was not sufficiently high for separation of it from the water phase by available commercial equipment. The separation of lactalbumin from milk whey is further complicated by its being present in whey only at 0.5 to 0.6 part of lactalbumin per 100 parts of the whey.

SUMMARY OF THE INVENTION

The present invention provides a rapid process for the separation of proteins utilizing limited amounts of precipitating agents while maintaining the protein in an undenatured condition. Particularly, undenatured lactalbumin products are obtained in both water-insoluble and water-soluble form in a rapid and economically feasible manner.

The invention comprises treatment of a crude source of protein so as to reduce the ratio of divalent cations to actual protein present in the source to no more than about 1 part by weight of divalent cations to 35 parts by weight actual protein in the source, and preferably complete removal of divalent cations, followed by admixing with the source a solubilized phosphate composition consisting essentially of one part by weight of a potassium polymetaphosphate and from about 5 to 15 parts of a sodium phosphate. The invention also comprises the resulting products.

DETAILED DESCRIPTION

The source of protein may be any animal or vegetable matter containing protein. Example are milk whey, corn steep liquor, soy bean whey, and the proteins released by the lysis of animal, vegetable, and microbial cells. The invention, however, has particular reference to the separation of lactalbumin from whey and will be described in connection therewith.

The whey used is ordinarily obtained as the byproduct from commercial production of cheeses, such, for example, as the whey remaining in the production of Cheddar, Swiss or cottage cheese. Whey obtained following acid precipitation of casein is also suitable. Sweet wheys are preferred.

The solubilized phosphate composition consists essentially of a potassium polymetaphosphate and a sodium phosphate. Suitable ratios are 5 to 15 parts by weight, and preferably 8 parts by weight, of sodium phosphate to 1 part of potassium polymetaphosphate. A preferred example of potassium polymetaphosphate is $(KPO_3)_n \cdot K_2O$ where $n$ is between 2,000 and 10,000. Especially suitable, is potassium polymetaphosphate which has an average molecular weight in excess of 500,000.

The class of sodium phosphates which are effective in solubilizing potassium polymetaphosphate in an aqueous solution includes chain and ring sodium phosphates and more specifically, sodium orthophosphates, sodium pyrophosphates, sodium polyphosphates, linear sodium polymetaphosphates and ring sodium polymetaphosphates. Specific examples of the suitable sodium phosphates are the following: monosodium, disodium and trisodium phosphates having the respective formulas $NaH_2PO_4$, $Na_2HPO_4$ and $Na_3PO_4$; sodium acid pyrophosphate, $$Na_2H_2P_2O_7$$

and tetrasodium pyrophosphate, $Na_4P_2O_7$; tripolyphosphate, $Na_5P_3O_{10}$; tetrapolyphosphate, $Na_6P_4O_{13}$; trimetaphosphate, $Na_3P_3O_9$; tetrametaphosphate, $Na_4P_4O_{12}$; and sodium polymetaphosphates having the general formula $(NaPO_3)_x \cdot Na_2O$ wherein $x$ is at least 5 and less than about 50. The term "sodium polymetaphosphate" designates compounds of the formula $(NaPO_3)_x \cdot Na_2O$ wherein $x$ is at least 5. An example of a specific sodium polymetaphosphate, which is suitable for solubilizing potassium polymetaphosphate, is sodium hexametaphosphate, a commercial product having an average chain length of 11 phosphate radicals, i.e., $x$ of 11.

Generally speaking, if the recovered proteins are intended for food use, any edible and non-toxic water-soluble sodium phosphate salt capable of effectively solubilizing potassium polymetaphosphate can be used.

Determination of the salt's effectiveness can be made by simply adding to water potassium polymetaphosphate and a sodium phosphate, in the ratio of from 5 to 15 parts by weight of the sodium phosphate to 1 part of potassium polymetaphosphate, and mixing the ingredients for a duration of less than one minute. If potassium polymetaphosphate is solubilized, then the particular sodium salt is an effective solubilizing agent and is suitable for purposes disclosed herein.

As to the amount of phosphate composition used to separate the lactalbumin, the amount may vary from about 0.045 to 0.45 and, for best results, from 0.1 to 0.2 parts by weight for 100 parts of the whey. Larger amounts of the phosphate composition may be used, but it is uneconomical to do so.

In general, the process comprises first reducing the ratio of divalent cations, acidifying the whey to a pH below the isoelectric point of lactalbumin, heating the whey using a temperature below that which will denature or coagulate the lactalbumin (preferably to about 110° F. to 140° F.), adding thereto (preferably in the form of a 10% aqueous solution) the phosphate composition and then separating the precipitated lactalbumin phosphate, as by centrifugal or other filtration technique. If desired, after cation removal the whey may first be heated and the acid and phosphate added together. The hold time between the phosphate addition and said separation is important and ordinarily about the minimum required for good mixing, i.e. about 5 to 60 seconds. Longer holding times can be used, but choice of the minimum hold time permits a continuous commercial operation. The separated product is acidic and water-insoluble and is made water-soluble, preferably by being neutralized with NaOH, or other alkali, to a pH of about 5.5 to 6.5. It can be used as such, but in commercial practice is preferably spray dried to a moisture content below about 5%.

Potassium polymetaphosphate is very unstable in solution and especially at a pH of 2.5 to 3.5. Consequently, the phosphate solution and the acidic decationized whey must be mixed preferably in-line on the way to a separating means, such as a centrifuge. With this in mind, it becomes apparent that the hold time or mixing time should be brief and on the order of from 2 to 30 seconds. The preferred mixing time is about five seconds, although a mixing time of from two seconds to five minutes can be utilized. Mixing time in excess of five or ten minutes causes sufficient depolymerization of the potassium polymetaphosphate to cause inefficient separation of the precipitated protein phosphate.

The removal of the divalent cations may be accomplished by a variety of means, as by precipitation of said cations, dialysis, electrodialysis, ion exchange resins, gel filtration, or other means conventional for such removal. The use of strong acid cation exchange resins adjusted to the acid cycle is preferred. Examples of suitable resins are the high density, sulfonated styrene-divinylbenzene copolymers typified by Amberlite IR–120 and Amberlite IR–200 (Rohm and Haas Co.), Dowex 50 (Dow Chemical Company), and Zeo-Karb 225 (Permutit Co.). Also suitable are the sulfonated phenolic resins such as Amberlite IR–100 (Rohm and Haas Co.).

It is preferred to remove substantially all of the divalent cations, but satisfactory results are obtained if removal leaves no more than about 2 to about 4 parts by weight of divalent cation/100 parts by weight of protein in the whey.

The temperature to which the whey is heated after divalent cation removal can vary between 40° and 170° F. provided it is kept below the temperature at which the lactalbumin is denatured or coagulated. In treating whey, any heating duration above 140° F. is kept short, i.e., not longer than 5 to 10 minutes. The temperature of 120° F. is recommended from the standpoint of reaction rate and product quality.

As to the acidifying agent, it can be any food grade acid such as sulfuric, hydrochloric, phosphoric or mixtures thereof, or a cation resin in the H+ cycle which can lower the pH of whey passed thereover to about 2.0. A pH of 3.5 after the addition of the acid or treatment with ion exchange resin is best for acid economy and product yield. However, any lower pH that would not denature the lactalbumin is satisfactory and, therefore, a pH range of from about 1 to about 4 is operative. The preferred pH range is 2.2 to 3.5. Utilization of an ion exchange resin in the acid cycle permits removal of divalent cations and acidification at the same time.

Lactalbumin phosphate exists as such below the isoelectric point of lactalbumin. Since the term "lactalbumin," as used herein, denotes a number of related proteins, the isoelectric point referred to here has an average value of about pH 5. Lactalbumin phosphate can be dissociated and lactalbumin can be recovered by raising the pH of the lactalbumin phosphate solution above the isoelectric point of lactalbumin, i.e., to about 5, and preferably 6.3. After disssociation, the phosphate ions are removed in an electrodialysis apparatus and the lactalbumin solution is spray-dried since it cannot be any longer precipitated by acidifying the solution below the isoelectric point of lactalbumin.

Removal of phosphate from protein phosphate, such as lactalbumin phosphate, is desirable and can be accomplished by an electrodialysis unit such as manufactured by Aqua-Chem. The low ash product thus obtained has a number of very important advantages over lactalbumin phosphate which has not been deashed. In dietary products where undeashed lactalbumin phosphate is the sole source of protein, the phosphate level is abnormally high and requires added calcium to give the proper mineral balance. However, even with a proper calcium/phosphate ratio, the total ash is too high for many uses because the concentration of the salts is too high for nutritional purposes. The low ash product eliminates these problems as well as flavor problems created by the high ash content in lactalbumin phosphate. Reduction of the phosphate level makes lactalbumin phosphate more soluble at low pH values permitting its use in acidic beverages, which greatly expands its market. It has also been recognized that reduction of the phosphatic level of lactalbumin phosphate improves stability of canned, sterilized imitation milk products and other milk-like beverages prepared with lactalbumin phosphate.

The problematic separation of the proteins from an aqueous phase, described, earlier, has been overcome by forming a protein-phosphate complex of sufficient specific gravity. In order to obtain a protein-phosphate complex of sufficient size and density to permit separation, it is first necessary to solubilize the gigantic potassium polymetaphosphate polymer. The preferred polymer has an average molecular weight in excess of about 500,000. Because of its size, potassium polymetaphosphate polymer is not soluble in water, however, it can be solubilized in aqueous solutions of sodium phosphate salts.

The solubilized potassium polymetaphosphate, having preferably the greatest possible chain length, is still ineffective in producing a protein-phosphate complex of sufficient density unless the divalent cations, such as calcium and magnesium, are reduced to an acceptable minimum. These cations compete with the proteins for binding sites on the potassium polymetaphosphate polymer, the net effect of which is to reduce the size of the protein-phosphate complex and decrease its density.

The invention will be further illustrated in the examples set forth below, proportions here and elsewhere herein being expressed as parts by weight unless specifically stated to the contrary.

Example 1

39,000 lbs. of Cheddar cheese whey in a holding tank having a pH of 6.13 and containing 54 mg. of calcium/100 gms. of whey was acidified to a pH of 2.35 by passage of the whey through an ion exchange column. The resin was a sulfonated cross-linked polystyrene (Amberlite IR–120) adjusted to the acid cycle with hydrochloric acid. The resin also decationized the whey so that the calcium left in the whey was only 6 mg./100 gms. of whey.

A 10% phosphate solution was prepared with an 8 to 1 mixture, respectively, of sodium hexametaphosphate (average of 11 phosphate units per molecule) and potassium polymetaphosphate (2,000–10,000 phosphate units per molecule).

The whey was pumped from the holding tank through a pipe to a centrifuge at a rate of 27,000 pounds per hour. Just prior to the centrifuge, steam was injected to raise the temperature of the whey to 110° F. and the phosphae was metered into the whey. The phosphate addition was in the proportion of one part of phosphate solution for every 50 parts of whey (1 lb. of phosphate per 500 lbs. of whey). The mixture traveled through 25 feet of pipe with two U-bends before entering the centrifuge. The time elapsed from addition of the phosphate to the centrifugation was about 7 seconds.

The lactalbumin phosphate precipitate removed from the centrifuge was neutralized to pH 6.0 with NaOH and spray-dried to a moisture content of 3.5%.

The yield of lactalbumin phosphate with 61.45% protein was .86% based on the total weight of the whey. The product was water soluble.

Example 2

Procedure of Example 1 was repeated with the exception that an electrodialysis step was included between the neutralization and the spray-drying steps.

The neutralized precipitate was pumped through an Aqua-Chem electrodialysis unit and the total ash content was reduced from 18% to 6%, on dry basis. An example of an electrodialysis apparatus is disclosed in the Block et al. Pat. 2,758,965 which issued on Aug. 14, 1956. The low ash protein solution was then spray-dried, although it could have been first condensed at a temperature below 130° F. and then spray-dried.

Example 3

The composition and procedure of Example 1 were used with the exception that cottage cheese whey was substituted for the cheddar cheese whey there used.

Water-soluble lactalbumin-phosphate with 50% protein was obtained.

Example 4

The composition and procedure of Example 1 are used except that corn steep liquor and soy bean whey are substituted, in turn, for the cheese whey there used. Removal of the divalent cations results in rapid precipitation of the proteins upon addition of the phosphate solution.

Example 5

127.5 parts of dry skim milk was mixed with 1372.5 parts of deionized water to give an 8.5% solids mixture. The pH was adjusted to 4.5 with lactic acid, the mixture centrifuged and the supernatant decanted and recovered.

The supernatant containing lactalbumin, was divided into two equal portions.

The first portion was adjusted to pH 7 with trisodium phosphate and centrifuged to remove the precipitate formed which was calcium phosphates and magnesium phosphates. The thus deionized whey was then adjusted to pH 3.5 with 1:1 HCl and processed to remove the lactalbumin by use of a 10% solution of an 8:1 mixture of sodium hexametaphosphate:potassium polymetaphosphate as set forth in Example 1.

The second portion was adjusted to pH 9 with trisodium phosphate and centrifuged to remove the divalent cations in the form of calcium and magnesium phosphates. The deionized whey was then treated with a 10% solution of an 8:1 mixture of sodium hexametaphosphate: potassium polymetaphosphate as set forth in Example 1 to separate the lactalbumin in the form of lactalbumin phosphate.

While appreciable amounts of the divalent cations can be removed from the whey by the use of the salt (trisodium phosphate), this precipitation is not as suitable as the use of the exchange resins.

Example 6

Two hundred pounds of low heat, defatted soy flakes were mixed with 1600 lbs. of water and the insoluble fiber removed on a vibrating screen. The extract was adjusted to pH 4.5 with hydrochloric acid and the precipitated soy protein was dewatered in a continuous centrifuge. The whey effluent was run through a cation exchange resin (Illco C211W) in the acid cycle. The cations were completely removed and the pH adjusted to 2.9 by passage through the resin.

A 10% phosphate solution was prepared with an 8 to 1 mixture, respectively, of sodium hexametaphosphate (average of 11 phosphate units per molecule) and potassium polymetaphosphate (2,000–10,000 phosphate units per molecule).

The whey from the ion exchanger was pumped to a centrifuge. Just prior to the centrifuge the phosphate solution was metered into the whey. The phosphate addition was in the proportion of one part of phosphate solution for every 90 parts of whey (1 lb. of phosphate per 900 lbs. of whey).

The soy albumin phosphate removed from the centifuge was neutralized to pH 6.0 with NaOH and spray dried to a moisture content of 3.5.

The yield of soy albumin phosphate was 0.68% based on the weight of defatted soy flakes.

The examples presented above were includede only for illustration of the invention. It will be understood that it is intended to cover all changes and modifications of the examples of the invention herein chosen for the purpose of illustration which do not constitute departures from the spirit and scope of the invention.

What is claimed is:

1. The method of separating protein in undenatured form from a crude source selected from milk whey, corn steep liquor, soy bean whey, and mixtures thereof comprising:

reducing the ratio of divalent cations to protein in the crude source to no more than about 1 part by weight of divalent cations to 35 parts by weight of protein in the crude source;

acidifying said crude source to a pH in the range of about 1–4;

heating said crude source to a temperature in the range of about 40° F. to 170° F.;

admixing with said crude source an aqueous solution of a phosphate composition consisting essentially of 1 part by weight of a potassium polymetaphosphate and from 5 to 15 parts by weight of a sodium phosphate capable of solubilizing the potassium polymetaphosphate;

holding the mixture of said crude source and the phosphate composition for a holding duration of about 2 to 30 seconds sufficient to effect mixing of said crude source with the phosphate composition and avoid depolymerization of the potassium polymetaphosphate; and separating the resulting protein phosphate from said crude source.

2. Method of claim 1 wherein said crude source is milk whey and said protein is lactalbumin.

3. Method of claim 1 wherein amount of the phosphate composition is in the range of 0.045 to 0.45 part by weight per 100 parts by weight of said crude source.

4. Method of claim 1 wherein amount of the phosphate composition is in the range of 0.1 to 0.2 part by weight per 100 parts by weight of said crude source.

References Cited

UNITED STATES PATENTS

| | | | |
|---|---|---|---|
| 2,377,624 | 6/1945 | Gordon | 260—112 |
| 2,465,906 | 3/1949 | Meade et al. | 99—57 |
| 2,467,453 | 4/1949 | Almy et al. | 127—31 |
| 2,555,211 | 5/1951 | Wallace | 127—31 |
| 2,669,559 | 2/1954 | Reid | 260—112 |
| 2,708,632 | 5/1955 | Stimpson | 99—54 |

OTHER REFERENCES

J. of Dairy Science, vol. 31, February 1948, pp. 145–151, Webb et al.

Advances in Protein Chemistry, vol. 5, 1949, pp. 202–205 and 210–215, McMeekin et al.

HOWARD E. SCHAIN, Primary Examiner

U.S. Cl. X.R.

99—17; 260—112 R, 123.5